United States Patent
Patch et al.

(10) Patent No.: US 10,444,090 B2
(45) Date of Patent: Oct. 15, 2019

(54) SYSTEM AND METHOD FOR SECURING SENSE DIE IN FORCE SENSOR

(71) Applicant: Honeywell International Inc., Morris Plains, NJ (US)

(72) Inventors: Jason Dennis Patch, Columbus, OH (US); Todd Eckhardt, Westerville, OH (US); Jim Machir, Columbus, OH (US); Richard Wade, Worthington, OH (US); Jim Cook, Columbus, OH (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/595,288

(22) Filed: May 15, 2017

(65) Prior Publication Data

US 2018/0328800 A1    Nov. 15, 2018

(51) Int. Cl.
*G01L 1/18* (2006.01)
*B06B 1/06* (2006.01)
*G01L 9/00* (2006.01)

(52) U.S. Cl.
CPC .............. *G01L 1/18* (2013.01); *B06B 1/0622* (2013.01); *G01L 9/0054* (2013.01)

(58) Field of Classification Search
CPC ... G01L 1/18; G01L 19/06; G01L 1/26; G01L 1/223; G01L 1/2231; B81B 7/0058; B81B 7/007; B81C 1/00301; H01L 2224/48091; H01L 23/04; H01L 2924/10253; H01L 2924/00; H01L 2224/73265; H01L 2924/00014; H01L 2924/1461

See application file for complete search history.

(56) References Cited

U.S. PATENT DOCUMENTS

| | | | | |
|---|---|---|---|---|
| 4,709,342 A | * | 11/1987 | Hosoda ............... | G01L 1/16 310/338 |
| 5,760,313 A | * | 6/1998 | Guentner ............ | G01L 1/18 73/862.584 |
| 5,999,084 A | * | 12/1999 | Armstrong ......... | H01C 10/106 200/516 |
| 6,201,285 B1 | | 3/2001 | Iwata et al. | |
| 6,543,292 B1 | * | 4/2003 | Colton ............... | G01L 19/143 73/723 |
| 7,234,359 B2 | * | 6/2007 | Hirose ............... | G01L 1/18 73/777 |
| 8,186,226 B2 | * | 5/2012 | Ricks ................. | G01L 19/02 73/708 |

(Continued)

*Primary Examiner* — Brandi N Hopkins
(74) *Attorney, Agent, or Firm* — Seager, Tufte & Wickhem LLP (57) ABSTRACT

A force sensor may comprise a sense die comprising a top part and a bottom part. Generally, the top part may comprise a first surface and a second surface, and the bottom part may comprise a first surface for direct contact with a substrate. Typically, the bottom part may be formed by removing a portion of the material of the sense die around the edges of a first face of the sense die. Typically, adhesive may replace the portion of the sense die material removed from the edges of the first face of the sense die. Thus, the adhesive may secure the first surface of the bottom part of the sense die directly to the substrate without serving as an interface between the bottom part of the sense die and the substrate.

13 Claims, 4 Drawing Sheets

(56) References Cited

U.S. PATENT DOCUMENTS

| | | | |
|---|---|---|---|
| 8,316,725 B2* | 11/2012 | Wade | G01L 1/18 |
| | | | 73/760 |
| 8,757,001 B2* | 6/2014 | Wade | G01L 1/18 |
| | | | 73/774 |
| 2007/0251328 A1* | 11/2007 | Selvan | G01L 1/18 |
| | | | 73/777 |
| 2008/0006092 A1 | 1/2008 | Brida et al. | |
| 2012/0144921 A1* | 6/2012 | Bradley | G01L 19/147 |
| | | | 73/727 |
| 2016/0068387 A1 | 3/2016 | Nakanishi | |

* cited by examiner

FIG. 3 though illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

SYSTEM AND METHOD FOR SECURING SENSE DIE IN FORCE SENSOR

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD

The present disclosure relates generally to force sensors, and more particularly, to force sensors for sensing a force applied to the sensors.

BACKGROUND

In many industrial areas it may be necessary to measure the magnitude of a force. Typically, force sensors may be used to sense the force applied to the sensors and provide an output signal representative of the applied force. Various force sensor designs can be used and can rely on a displacement of a component (e.g. stress-field applied to a stress-sensitive element) to measure the presence of a force and/or an amount of the force applied on the sensor. Force sensors may be used in a wide variety of applications, such as medical applications, military applications, flight control applications, weather monitoring applications, industrial process applications, as well as many other applications.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field (for example, +/−10%); and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The embodiments of this disclosure typically relate to sensors, and more specifically, to force sensors for sensing the magnitude of a force. Typically, force sensors may be used to sense the force applied to the sensors and provide an output signal representative of the applied force. Force sensors may be used in a wide variety of applications, such as medical applications, military applications, flight control applications, weather monitoring applications, industrial process applications, as well as many other applications. Generally, various force sensor designs may be used and may rely on a displacement of a component (e.g. stress-field applied to a stress-sensitive element) to measure the presence of a force and/or an amount of the force applied on the sensor.

Conventionally, force sensors may comprise sense die. Typically, the sense die may be secured to a substrate using adhesive between the sense die and the substrate. Additionally, the force sensor may comprise an actuation element and/or an actuation assembly. Generally, the actuation element may be configured to transmit a uniaxial force normal to the plane of the sense die. In this manner, typically, the one or more sense elements (e.g. piezoresistive elements) having an electrical resistance that varies depending on the amount of mechanical stress applied may detect a change in force, such as a pressure, as the actuation element contacts the plane of the sense die. Thus, when the actuation element transmits a uniaxial force normal to the plane of the sense die, the material of the sense die may compress and/or flex in response to the transmitted force. As a result, the adhesive between the sense die and the substrate may compress and/or flex. However, since a part of the force, such as a pressure, gets transmitted to the adhesive for compression, the electrical output from the sense die may not be linear. Additionally, the thickness of the adhesive may affect the height tolerance of the force sensor assembly.

Thus, embodiments of the disclosure may provide a force sensor assembly comprising a top part and a bottom part (e.g., a top portion and a bottom portion of an optionally unitary sense die) where the bottom surface of the bottom part of the sense die directly contacts the substrate. Generally, the sense die may be formed from silicon or other semiconductor material. While the sense die is described with respect to being formed from silicon, it should be understood that other materials can also be used. In some embodiments, the sense die may begin as a silicon chip and be processed to form the sense die having the top part and the bottom part. The top part may comprise a first surface and a second surface, and the bottom part may comprise a first surface for interaction with the substrate. Typically, the first surface of the top part of the sense die may comprise a Wheatstone bridge, sensing elements, wire bonds, etc. that may move under an applied force. The bottom part may be formed by removing the sense die material from the outer edges of the face of the sense die opposite the one or more sense elements. This process may leave sense die material at the center to form the bottom part of the sense die. Generally, the sense die material may be removed using etching processes such as wet etching (KOH), dry etching (DRIE), fine abrasion or grinding (Ion Beam Machining), and/or other etching processes. The sense die material forming the bottom part of the sense die may be etched to form a square pattern. In some embodiments, the bottom part of the sense die may be etched to form a triangular, rectangular, circular, polygonal, etc. pattern. Once the bottom part is formed, adhesive may replace the area where the sense die material was removed (in other words, fill in the gap surrounding the bottom part of the sense die). Typically, the bottom surface (e.g. first surface) of the bottom part of the sense die may be free of the adhesive causing it to make contact directly with the substrate.

Since the sense die may directly contact the substrate, the total height tolerance may be equal to the sense die height tolerance. In other words, the adhesive may not add to the total height tolerance of the force sensor. For example, in some conventional embodiments, the adhesive may add ±50 microns of variation while the actuation element and the sense die may only add an ±8 micron variation. In conventional embodiments, the adhesive layer may increase (e.g. significantly) the assembly height tolerance and variation of the force sensor. Thus, with the removal of the adhesive between the sense die and the substrate, the part-to-part variation may be decreased, and the accuracy of the force sensor may be improved. Also, when force is applied to the first surface of the sense die, the electrical output may be more linear due to the lack of adhesive (because the adhesive may not also need to be compressed in addition to the sense die).

Disclosed embodiments may comprise an actuation element. Typically, the actuation element may include a spherical object, a pin, an extender, a button, any other activation device, and/or a combination thereof. It may be appreciated that other types of actuators may be utilized, such as, for example, slidable mounted plungers or shafts, point of contact type components other than spherical objects, and/or "T"-shaped transfer mechanisms, in accordance with alternative embodiments. If desired, only a portion of an outer surface of the actuation element may be spherical in shape or take on a particular shape. The actuation element may be made of any material. For example, the actuation element may be formed from stainless steel, a polymer, a ceramic, jeweled, another suitable metal, and/or another suitable material. In some cases, the actuation element may include a stainless steel ball bearing. It is contemplated, however, that other generally spherical and other shaped elements may be used as or as part of the actuation element, if desired, including polymer based objects.

In some embodiments, one or more bond pads may be formed on the first surface of the top part of the sense die. Metal, diffusion, or other interconnect may be provided to interconnect the one or more piezoresistive sense elements and the one or more bond pads. In some embodiments, signal conditioning circuitry may also be formed in or on the first surface of the top part of the sense die. The signal conditioning circuitry may condition one or more sensor signals received from the one or more sense elements before providing a conditioned output to the one or more of the bond pads. Generally, the signal conditioning circuitry may include amplification, analog-to-digital conversion, offset compensation circuitry, linearization, temperature compensation, and/or other suitable signal conditioning functions.

Generally, in use, the sense die and/or the substrate may be configured to flex in response (or at least have some elastic response) to an applied force, creating stress fields that may extend through the one or more sense elements thereby allowing the applied force to be determined. Typically, in disclosed embodiments, the sense die may flex towards the substrate which may flex in response to the force transmitted through the sense die. Generally, the force load (e.g. actuation element) may input stress into the top surface of the sense die, and the amount of force may affect the one or more sense elements (e.g. piezoresistors) to provide the electrical output indicative of the amount of stress applied to the sense die. In some embodiments, the top surface of the sense die may compress under the force load (e.g. actuation element) at a minute level. Additionally, the adhesive may not be located between the sense die and the substrate. Thus, due to the lack of adhesive, when the sense die may flex in response to an applied force, the electrical output signals may be more linear.

Typically, when the sense elements are piezoresistive sense elements, applying a current through the sense elements may provide a signal that corresponds to the amount of force applied to the sensing die. Generally, the signal may be communicated from the one or more sense elements to the bond pads which may typically be disposed on the force sensing die such that when assembled, the wire bond pads may be accessible for electrical connection to other components via wire bonds or the like. In some cases, the resulting signal may be conditioned by conditioning circuitry and output via electrical leads. While persons of skill should understand the disclosed embodiments based on the above disclosure, the following figures may provide specific examples that may further clarify the disclosure.

Figure 1A:
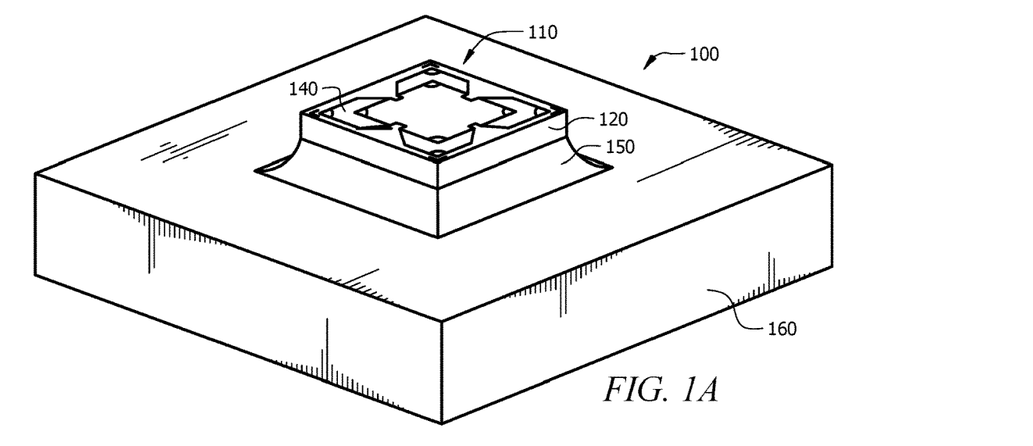
FIG. 1A illustrates a perspective view of an exemplary embodiment of a sense die attached to a substrate using adhesive.

Turning now to the drawings, FIG. 1A illustrates a perspective view of an exemplary embodiment of a force sensor 100 comprising a sense die 110 and a substrate 160. Typically, the surface of the top surface or part 120 of the sense die 110 may comprise a plurality of sensing elements 140 (e.g., which can be arranged in a full or partial Wheatstone bridge, etc.), bond pads, wire bonds, etc. that may deflect under an applied force (e.g. from an actuation element). The sense die 110 may also comprise a bottom part or surface which may be formed by removing sense die material from the outer edges of the face of the sense die 110 opposite the one or more sense elements 140 (shown more clearly in FIG. 1B and FIG. 1C). This process may leave sense die material at the center to form the bottom part of the sense die 110. Additionally, by removing sense die material from the bottom edges of the sense die 110, a gap may be formed surrounding the bottom part of the sense die 110. Typically, the gap may be replaced with adhesive 150. By leaving sense die material at the center to form the bottom part of the sense die 110 and surrounding the bottom part of the sense die 110 with adhesive 150, the sense die 110 may directly contact the substrate 160. In other words, when the sense die 110 is attached to the substrate 160, the adhesive 150 may not be located between the bottom part of the sense die 110 and the substrate 160. Therefore, regardless of whether the sense die 110 is receiving an applied force, the sense die 110 may directly contact the substrate 160 at all times. In the exemplary embodiment of FIG. 1A, the sense elements 140 may comprise piezoresistive sense elements, the sense die 110 may be formed from silicon or other semiconductor material, and the substrate 160 may be formed of PCB materials (FR2, FR3, FR4, FR5, FR6, G10, G11, CEM1, CEM2, CEM3, CEM4, CEM5, etc.), alumina ceramic, stainless steel, aluminum, Sn plated terminals, Ag plated terminals, polymer materials (PBT, LCP, etc.), Kapton, RF35, PTFE, etc.

Figure 1B:
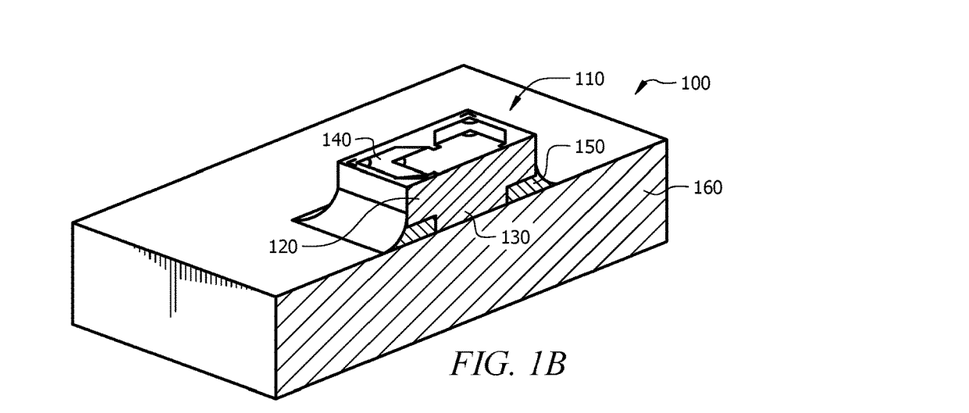
FIG. 1B illustrates a perspective, cross-sectional view of an exemplary embodiment of a sense die attached to a substrate using adhesive (similar to the exemplary embodiment shown in FIG. 1A)

FIG. 1B illustrates a perspective, cross-sectional view of an exemplary embodiment of a sense die 110 attached to a substrate 160 using adhesive 150 (similar to the exemplary embodiment shown in FIG. 1A). The embodiment shown in FIG. 1B more clearly illustrates the two parts of the sense die 110: the top part 120 and the bottom part 130. Typically, the bottom part 130 of the sense die 110 may be formed by removing the sense die material from the outer edges of the face of the sense die 110 opposite the one or more sense elements 140. This process may leave sense die material at the center to form the bottom part 130 of the sense die 110. Generally, the sense die material may be removed using etching processes such as wet etching (KOH), dry etching (DRIE), fine abrasion or grinding (Ion Beam Machining), and/or other etching processes. The sense die material forming the bottom part 130 of the sense die 110 may be etched to form a square pattern (as shown in the exemplary embodiment of FIG. 1B). In some embodiments, the bottom part 130 of the sense die 110 may be etched to form a triangular, rectangular, circular, polygonal, etc. pattern. Once the bottom part 130 is formed, adhesive 150 may replace the area where the sense die material was removed (in other words, fill in the gap surrounding the bottom part 130 of the sense die 110). In some embodiments, the adhesive 150 may extend outward beyond the sense die 110 as shown in the embodiment of FIG. 1B. Typically, the bottom surface (e.g. first surface) of the bottom part 130 of the sense die 110 may be free of the adhesive 150 causing it to make contact directly with the substrate 160 at all times.

Figure 1C:
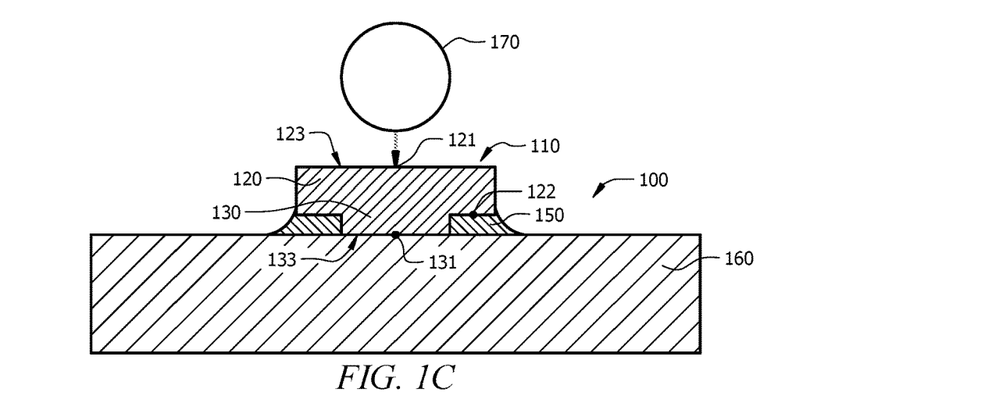
FIG. 1C illustrates a side, cross-sectional view of an exemplary embodiment of a sense die attached to a substrate using adhesive and comprising an actuation element (similar to the exemplary embodiments shown in FIG. 1A-FIG. 1B)

FIG. 1C illustrates a side, cross-sectional view of an exemplary embodiment of a sense die 110 attached to a substrate 160 using adhesive 150 (similar to the exemplary embodiments shown in FIG. 1A-FIG. 1B). Typically, the sense die 110 may comprise a top part 120 and a bottom part 130. The top part 120 of the sense die 110 may be configured for interaction with an actuation element 170. In the embodiment of FIG. 1C, the actuation element 170 can be a spherical ball bearing and may comprise stainless steel, a polymer, a ceramic, another suitable metal, and/or another suitable material (e.g. polymer based objects). In some embodiments, the actuation element 170 may comprise a different shape. For example, the actuation element 170 may be T-shaped, cylindrical, trapezoidal, triangular, elliptical, or any other shape comprising at least one end configured to make focal contact with the surface of the top part 120 of the sense die 110. Typically, the top part 120 may comprise a first surface 121 and a second surface 122. The bottom part 130 may comprise a first surface 131 (also known as the third surface). Additionally, the sense die 110 may comprise a first face 133 and a second face 123. Typically, the first face 133 may comprise one or more sense elements as shown in the exemplary embodiment of FIG. 1A-FIG. 1B. The second face 123 of the sense die 110 may be located opposite the first face 133. Typically, the bottom part 130 of the sense die 110 may be formed by removing sense die material from the outer edges of the second face 123 of the sense die 110. In the exemplary embodiment of FIG. 1C, the sense die material forming the bottom part 130 of the sense die 110 may be formed by removing the outer edges of the second face 123 of the sense die 110. Typically, the gap surrounding the bottom part 130 of the sense die 110 may be filled in with adhesive 150. The adhesive 150 may contact the second surface 122 of the top part 120 of the sense die 110, the edges of the bottom part 130 of the sense die 110, and a portion of the substrate 160 surrounding the contact area between the bottom part 130 of the sense die 110 and the substrate 160. In some embodiments, the adhesive 150 may extend outward beyond the sense die 110 as shown in the embodiment of FIG. 1B. Typically, the bottom surface (e.g. first surface 131) of the bottom part 130 of the sense die 110 may be free of the adhesive 150 causing it to make contact directly with the substrate 160 at all times.

Figure 2A:
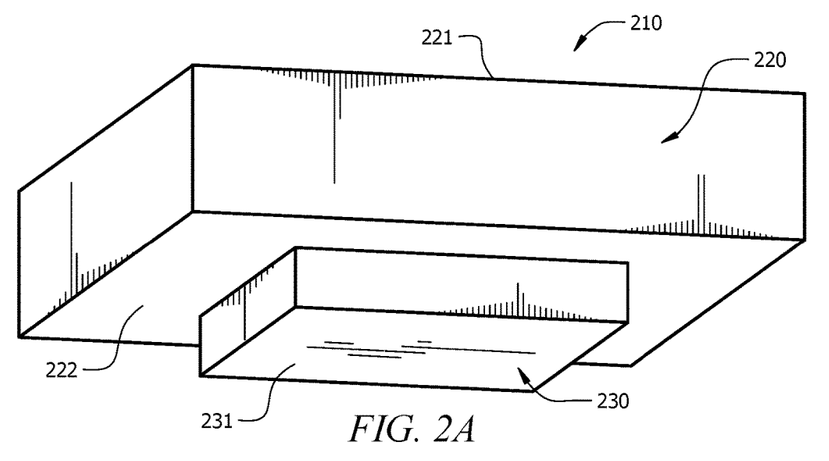
FIG. 2A illustrates a perspective view of an exemplary embodiment of a sense die comprising a top part and a bottom part.

FIG. 2A illustrates a perspective view of an exemplary embodiment of a sense die 210 comprising a top part 220 and a bottom part 230. Typically, the top part 220 of the sense die 210 may comprise a first surface of the top part 221 and a second surface of the top part 222, and the bottom part 230 of the sense die 210 may comprise a first surface of the bottom part 231. Generally, the sense die 210 may initially be a slab die. To form the embodiment shown in FIG. 2A, the edges of one face of the slab die may be removed to form a top part 220 of the sense die 210 and a bottom part 230 of the sense die 210. The amount of sense die 210 material removed from the edges of the sense die 210 may vary depending on the application. Typically, the amount of sense die material removed may be enough to allow adhesive to fill in the gap formed by removing the edges of the sense die 210. Additionally, the amount of sense die material removed may depend on the amount of adhesive required to securely attach/hold the sense die 210 on the substrate.

Figure 2B:
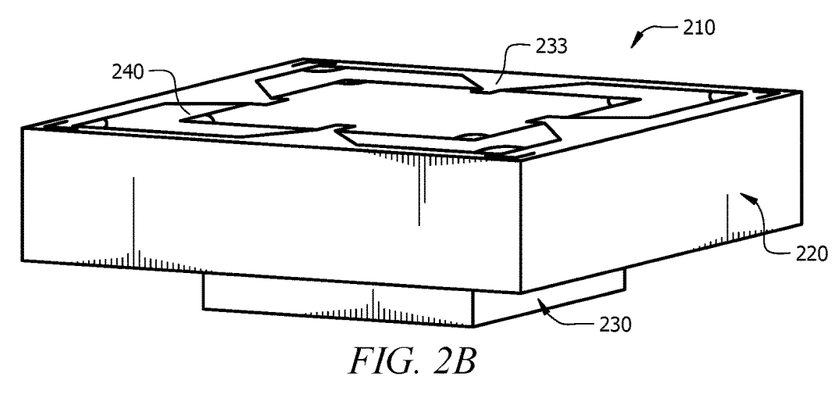
FIG. 2B illustrates an alternative, perspective view of an exemplary embodiment of a sense die comprising a top part having one or more sense elements and a bottom part (similar to the exemplary embodiment shown in FIG. 2A)

FIG. 2B illustrates an alternative, perspective view of an exemplary embodiment of a sense die 210 comprising a top part 220 and a bottom part 230 (similar to the exemplary embodiment shown in FIG. 2A). Typically, the top part 220 of the sense die 210 may comprise a first face 233. In the embodiment of FIG. 2B, the first face 233 of the sense die 210 comprises one or more sense elements 240. In some embodiments, one or more bond pads may be formed on the first face 233 of the top part 220 of the sense die 210. Metal, diffusion, or other interconnect may be provided to interconnect the one or more piezoresistive sense elements and the one or more bond pads. In some embodiments, signal conditioning circuitry may also be formed in or on the first face 233 of the top part 220 of the sense die 210. The signal conditioning circuitry may condition one or more sensor signals received from the one or more sense elements 240 before providing a conditioned output to the one or more of the bond pads. Generally, the signal conditioning circuitry may include amplification, analog-to-digital conversion, offset compensation circuitry, linearization, temperature compensation, and/or other suitable signal conditioning functions.

Figure 2C:
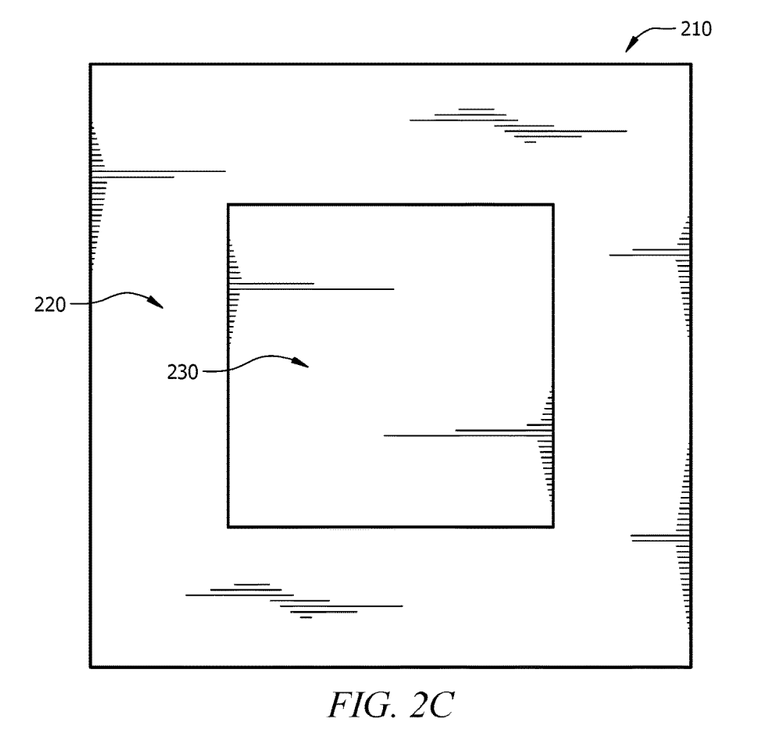
FIG. 2C illustrates a bottom view of an exemplary embodiment of a sense die comprising a top part and a bottom part (similar to the exemplary embodiments shown in FIG. 2A FIG. 2B)

FIG. 2C illustrates a bottom view of an exemplary embodiment of a sense die 210 comprising a top part 220 and a bottom part 230 (similar to the exemplary embodiments shown in FIG. 2A-FIG. 2B). Typically, the sense die material may be removed from one face of the sense die 210 to form a bottom part 230 of the sense die 210. In the exemplary embodiment of FIG. 2C, the bottom part 230 of the sense die 210 is etched to form a square. In some embodiments, the bottom part 230 of the sense die 210 may be etched to form a triangular, rectangular, circular, polygonal, etc. pattern. Additionally, the sense die material may be removed evenly from all edges to ensure the bottom part 230 of the sense die 210 is concentric (e.g. sharing the same center) with the top part 220 of the sense die 210.

Figure 2D:
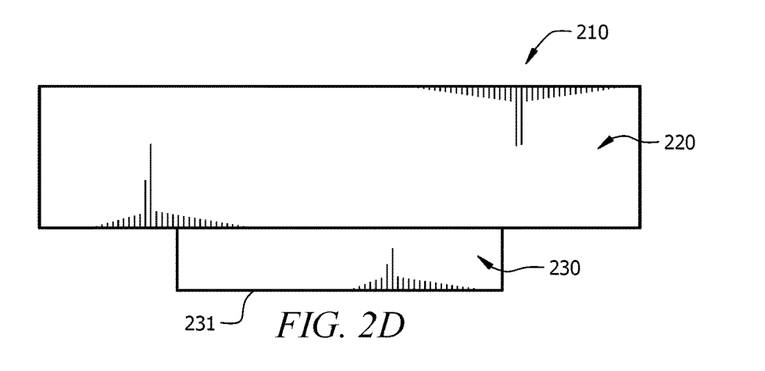
FIG. 2D illustrates a side view of an exemplary embodiment of a sense die comprising a top part and a bottom part (similar to the exemplary embodiments shown in FIG. 2A FIG. 2C)

FIG. 2D illustrates a side view of an exemplary embodiment of a sense die 210 comprising a top part 220 and a bottom part 230 (similar to the exemplary embodiments shown in FIG. 2A-FIG. 2C). Typically, the top part 220 of the sense die 210 may comprise a larger width, length, and height as compared to the bottom part 230 of the sense die 210. Additionally, as shown in FIG. 1C, the bottom part 230 of the sense die 210 may be surrounded on all sides with adhesive. This may allow the first surface 231 of the bottom part 230 of the sense die 210 to be directly attached to a substrate (e.g. without adhesive located between the first surface 231 of the bottom part 230 of the sense die 210 and the substrate).

Figure 3:
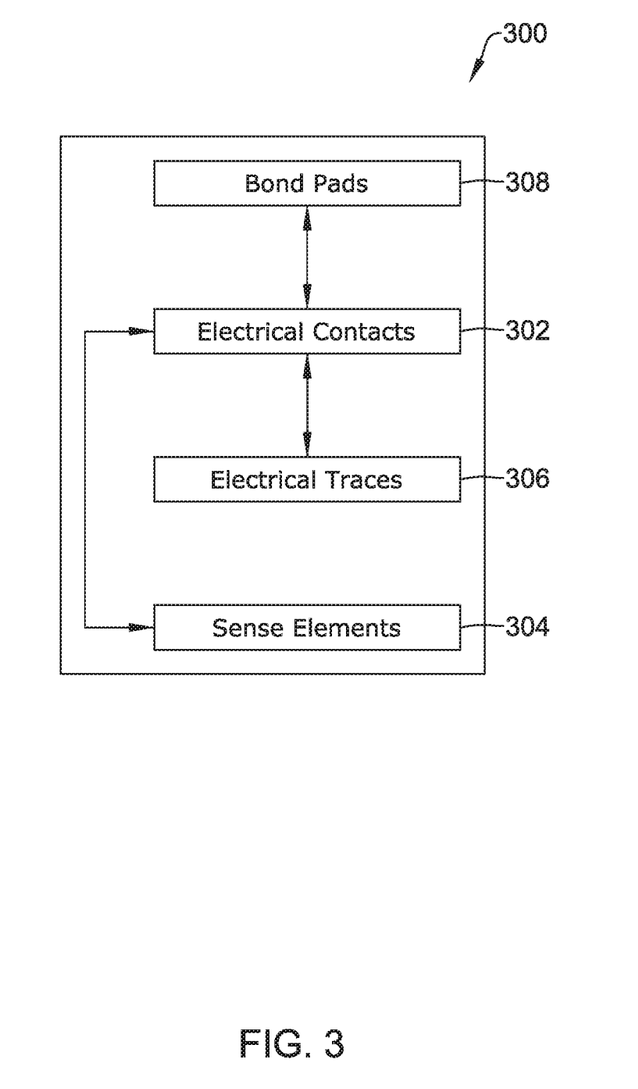
FIG. 3 is a schematic block diagram of components of an illustrative force sensor.

FIG. 3 is a schematic block diagram of components of an illustrative force sensor 300. The illustrative force sensor 300 includes one or more electrical contacts 302 which may be supported by a first surface of a top part of a sense die. One or more sense elements 304 of the force sensor may be electrically connected to the one or more electrical contacts 302. A substrate of the force sensor 300 may include electrical traces 306. One or more electrical contacts 302 may be configured to be electrically coupled to the electrical traces 306 of the substrate. The illustrative force sensor 300 may further include one or more bond pads 308, and the one or more electrical contacts 302 may be electrically coupled to one or more of the bond pads 308.

Having described device embodiments above, especially with regard to the figures, various additional embodiments can include, but are not limited to the following:

In a first embodiment, a force sensor comprising: a substrate; and a sense die comprising a top part and a bottom part, wherein the top part comprises a first surface and a second surface, and the bottom part comprises a first surface, wherein the sense die is secured to the substrate between the second surface of the top part and the substrate, and wherein the first surface of the bottom part directly contacts the substrate. A second embodiment can include the force sensor of the first embodiment, wherein the sense die is secured to the substrate using adhesive between the second surface of the top part and the substrate. A third embodiment can include the force sensor of the first to second embodiments, wherein application of external force or pressure to the first surface of the top part results in compression of the sense die and generation of electrical signals in the sense die which are approximately linear to the applied external force or pressure. A fourth embodiment can include the force sensor of the first to third embodiments, wherein the bottom part of the sense die is formed by etching of the sense die. A fifth embodiment can include the force sensor of the first to fourth embodiments, wherein the sensor is an absolute pressure sensor. A sixth embodiment can include the force sensor of the first to fifth embodiments, wherein the sensor is a differential pressure sensor. A seventh embodiment can include the force sensor of the first to sixth embodiments, further comprising an actuation element configured to transmit a force to the first surface of the top part of the sense die. An eighth embodiment can include the force sensor of the first to seventh embodiments, further comprising one or more sense elements supported by the first surface of the top part of the sense die. A ninth embodiment can include the force sensor of the first to eighth embodiments, wherein the one or more sense elements comprise one or more piezoresistive elements. A tenth embodiment can include the force sensor of the first to ninth embodiments, further comprising one or more electrical contacts supported by the first surface of the top part of the sense die and wherein the one or more sense elements are electrically connected to the one or more electrical contacts. An eleventh embodiment can include the force sensor of the first to tenth embodiments, wherein the substrate comprises electrical traces and wherein the one or more electrical contacts are configured to be electrically coupled to the electrical traces of the substrate. A twelfth embodiment can include the force sensor of the first to eleventh embodiments, further comprising one or more bond pads, wherein the one or more electrical contacts is electrically coupled to the one or more bond pads. A thirteenth embodiment can include the force sensor of the first to twelfth embodiments, wherein the length of the top part of the sense die is greater than the length of the bottom part of the sense die. A fourteenth embodiment can include the force sensor of the first to thirteenth embodiments, wherein the height of the top part of the sense die is greater than the height of the bottom part of the sense die. A fifteenth embodiment can include the force sensor of the first to fourteenth embodiments, wherein the width of the top part of the sense die is greater than the width of the bottom part of the sense die.

Exemplary embodiments might also relate to a method for detecting force using a force sensor (e.g. similar to those described above, which may be considered optionally incorporated herein with respect to the discussion of the system). Such method embodiments, for example, might include, but are not limited to, the following:

In a sixteenth embodiment, a method for detecting force using a force sensor, the method comprising: applying a force to the force sensor, the force sensor comprising an actuation element, a substrate, and a sense die, wherein the actuation element is configured to transmit a force to the sense die, wherein the sense die comprises a top part and a bottom part, wherein the top part comprises a first surface and a second surface, and the bottom part comprises a first surface, wherein the sense die is secured to the substrate between the second surface of the top part and the substrate, wherein the first surface of the bottom part directly contacts the substrate, and wherein the sense die further comprises one or more sense elements; detecting a force increase by the one or more sense elements of the sense die; at least partially contacting the first surface of the top part of the sense die by the actuation element; deflecting at least a portion of the one or more sense elements due to the force; and transmitting, by the sense die, an electrical output signal. A seventeenth embodiment can include the method of the sixteenth embodiment, wherein the first surface of the bottom part directly contacts the substrate at all times. An eighteenth embodiment can include the method of the sixteenth to seventeenth embodiments, wherein applying a force to the force sensor results in flexing of at least a portion of the substrate.

Exemplary embodiments might also relate to a method for assembling a force sensor (e.g. similar to those described above, which may be considered optionally incorporated herein with respect to the discussion of the system). Such method embodiments, for example, might include, but are not limited to, the following:

In a nineteenth embodiment, a method for assembling a force sensor, the method comprising: forming a top part and a bottom part of the sense die by removing a portion of the material of the sense die around the edges of a first face of the sense die; applying adhesive to a second surface of the top part of the sense die; applying sense elements to a second face of the sense die; and securing, using the adhesive, the first surface of the bottom part of the sense die to a substrate. A twentieth embodiment can include the method of the nineteenth embodiment, wherein removing a portion of the material of the sense die around the edges of a first face of the sense die comprises etching the sense die. A twenty-first embodiment can include the method of the nineteenth to twentieth embodiments, wherein the first surface of the bottom part of the sense die is free of adhesive. A twenty-second embodiment can include the method of the nineteenth to twenty-first embodiments, wherein the adhesive is applied to the outer edges of the first face of the sense die where a portion of the material of the sense die around the edges of the first face of the sense die is removed. A twenty-third embodiment can include the method of the nineteenth to twenty-second embodiments, wherein etching of the outer edges of the first face of the sense die results in a lesser height for the bottom part of the sense die than the top part of the sense die. A twenty-fourth embodiment can include the method of the nineteenth to twenty-third embodiments, wherein etching of the outer edges of the first face of the sense die results in a lesser width for the bottom part of the sense die than the top part of the sense die. A twenty-fifth embodiment can include the method of the nineteenth to twenty-fourth embodiments, wherein etching of the outer edges of the first face of the sense die results in a projection of the bottom part of the sense die from the top part of the sense die, wherein the projection of the bottom part is concentric with the top part of the sense die.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification, and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system, or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A force sensor comprising:
    a substrate; and a sense die comprising a top part and a bottom part, wherein the top part comprises a first surface and a second surface, and the bottom part comprises a third surface, wherein the third surface of the bottom part directly contacts the substrate, and wherein the second surface is spaced above the substrate to provide a space between the second surface of the top part of the sense die and the substrate when the third surface of the bottom part is in direct contact with the substrate; and an adhesive extending into the space between the second surface of the top part of the sense die and the substrate to secure the sense die to the substrate.

2. The force sensor of claim 1, wherein application of external force or pressure to at least part of the first surface of the top part of the sense die is configured to change an electrical property of a component of the sense die approximately linearly with respect to the applied external force or pressure.

3. The force sensor of claim 1, wherein the bottom part of the sense die is formed by removing a portion of a perimeter of the sense die to reveal the second surface of the top part of the sense die, wherein the removed portion defines at least part of the space between the second surface of the top part of the sense die and the substrate.

4. The force sensor of claim 1, further comprising an actuation element configured to transmit a force to part of the first surface of the top part of the sense die.

5. The force sensor of claim 1, further comprising one or more sense elements supported by the first surface of the top part of the sense die.

6. The force sensor of claim 5, wherein the one or more sense elements comprise one or more piezoresistive elements.

7. The force sensor of claim 1, further comprising one or more electrical contacts supported by the first surface of the top part of the sense die, and wherein the one or more sense elements are electrically connected to the one or more electrical contacts.

8. The force sensor of claim 7, wherein the substrate comprises electrical traces, and wherein the one or more electrical contacts are configured to be electrically coupled to the electrical traces of the substrate.

9. The force sensor of claim 8, further comprising one or more bond pads, wherein the one or more electrical contacts are electrically coupled to the one or more bond pads.

10. The force sensor of claim 1, wherein a length, a width, and a height of the top part of the sense die is greater than a length, a width, and a height of the bottom part of the sense die.

11. A method for detecting force using a force sensor, the method comprising:

applying a force to the force sensor, the force sensor comprising an actuation element, a substrate, and a sense die, wherein the actuation element is configured to transmit the force to the sense die, wherein the sense die comprises a top part and a bottom part, wherein the top part comprises a first surface and a second surface, and the bottom part comprises a third surface, wherein the third surface of the bottom part directly contacts the substrate, and wherein the second surface is spaced above the substrate to provide a space between the second surface of the top part of the sense die and the substrate when the third surface of the bottom part is in direct contact with the substrate, wherein an adhesive is disposed in the space between the second surface of the top part of the sense die and the substrate to help secure the sense die to the substrate, and wherein the sense die further comprises one or more sense elements;

stressing at least a portion of the one or more sense elements due to the force; and changing an electrical property of the one or more sense elements in response to the stressing.

12. The method of claim 11, wherein the third surface of the bottom part directly contacts the substrate at all times after the adhesive is cured.

13. The method of claim 11, wherein applying a force to the force sensor results in flexing of at least a portion of the substrate.

* * * * *